United States Patent
Delo (10) Patent No.: US 6,606,618 B2
(45) Date of Patent: Aug. 12, 2003

(54) METHOD FOR OPTIMIZING THE PERFORMANCE OF A DATABASE

(75) Inventor: John C. Delo, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 106 days.

(21) Appl. No.: 09/792,661

(22) Filed: Feb. 23, 2001

(65) Prior Publication Data

US 2001/0032199 A1 Oct. 18, 2001

Related U.S. Application Data (62) Division of application No. 09/157,853, filed on Sep. 21, 1998.

(51) Int. Cl.[7] .............................................. G06F 17/30
(52) U.S. Cl. ................................. 707/2; 707/3; 707/10; 707/100; 707/201
(58) Field of Search ................................. 707/1, 2, 3, 4, 707/5, 100, 101, 102, 103 R, 104.1, 201, 203, 10

(56) References Cited

U.S. PATENT DOCUMENTS

| | | | | |
|---|---|---|---|---|
| 5,410,704 A | * | 4/1995 | Norden-Paul et al. ...... | 395/700 |
| 5,675,784 A | * | 10/1997 | Maxwell et al. ............ | 395/611 |
| 5,717,924 A | * | 2/1998 | Kawai ........................ | 395/613 |
| 5,752,018 A | * | 5/1998 | Sheffield .................... | 395/602 |
| 5,864,842 A | * | 1/1999 | Pederson et al. ............. | 707/3 |
| 5,918,225 A | * | 6/1999 | White et al. ................. | 707/3 |
| 5,930,779 A | * | 7/1999 | Knoblock et al. .......... | 705/412 |
| 6,032,151 A | * | 2/2000 | Arnold et al. .............. | 707/103 |
| 6,044,369 A | * | 3/2000 | Black .......................... | 707/4 |
| 6,058,389 A | * | 5/2000 | Chandra et al. ............. | 707/1 |

* cited by examiner

Primary Examiner—Hosain T. Alam
Assistant Examiner—Jacques Veillard
(74) Attorney, Agent, or Firm—Workman, Nydegger & Seeley (57) ABSTRACT

A relational installation database for storing data elements in the form of strings, objects, etc. is aliased with integer identifiers corresponding to each data element is disclosed. The integer identifiers are obtained from an index that sequentially stores a copy of each unique occurrences of a data element. Populating an installation database with only integers reduces persistent size and provides uniformity to the data fields underlying the database tables, and provides a significant improvement in database performance The uniform data fields may be expanded and contracted to add temporary rows and columns directly to a database table. Database tables may be created in a modular fashion and may be efficiently merged together when the software product is complete. Also, differences between various versions of the software product may be recorded in database transforms.

18 Claims, 6 Drawing Sheets

230 — INDEX (232)

| # | |
|---|---|
| 1 | Feature_ID — 207 |
| 2 | Feature_Name — 209 |
| 3 | Attribute_F_A — 211 |
| 4 | Attribute_F_B — 212 |
| 5 | Feature_1 |
| 6 | Feature_2 |
| 7 | Feature_3 |
| 8 | Feature_One |
| 9 | Feature_Two |
| 10 | Feature_Three |
| 11 | Attribute_F_One |
| 12 | Attribute_F_Two |
| 13 | Attribute_F_Three |
| 14 | Attribute_F_Four |
| 15 | Attribute_F_Five |
| 16 | Component_ID — 217 |
| 17 | Component_Name — 219 |
| 18 | Attribute_C_A — 221 |
| 19 | Attribute_C_B — 222 |
| 20 | Component_1 |
| 21 | Component_2 |
| 22 | Component_3 |
| 23 | Component_4 |
| 24 | Component_5 |
| 25 | Component_6 |
| 26 | Component_7 |
| 27 | Component_8 |
| 28 | Component_One |
| 29 | Component_Two |
| 30 | Component_Three |
| 31 | Component_Four |
| 32 | Component_Five |
| 33 | Component_Six |
| 34 | Component_Seven |
| 35 | Component_Eight |
| 36 | Attribute_C_One |
| 37 | Attribute_C_Two |
| 38 | Attribute_C_Three |
| 39 | Attribute_C_Four |
| 40 | Attribute_C_Five |
| 41 | Attribute_C_Six |
| 42 | Attribute_C_Seven |
| 43 | Attribute_C_Eight |
| 44 | Attribute_C_Five |
| 45 | Attribute_C_Ten |
| 46 | Feature_Preference — 213 |
| 47 | Comp_Preference — 223 |
| 48 | Prefer_Absent |
| 49 | Prefer_Local |
| 50 | Prefer_Source |
| 51 | Prefer_Advertise |
| 52 | Feature_Table — 205 |
| 53 | Component_Table — 215 |
| 54 | Feature_Comp_Table — 225 |

200'

205' — Table 52

| 1 | 2 | 3 | 4 | 46 |
|---|---|---|---|----|
| 5 | 8 | 11 | 12 | 1 |
| 6 | 9 | 13 | 11 | 1 |
| 7 | 10 | 15 | 14 | 1 |

215' — Table 53

| 16 | 17 | 18 | 19 | 47 |
|----|----|----|----|----|
| 20 | 28 | 38 | 36 | 1 |
| 21 | 29 | 36 | 37 | 0 |
| 22 | 30 | 39 | 40 | 1 |
| 23 | 31 | 38 | 41 | 2 |
| 24 | 32 | 36 | 42 | 1 |
| 25 | 33 | 43 | 37 | 2 |
| 26 | 34 | 44 | 40 | 3 |
| 27 | 35 | 38 | 45 | 3 |

225' — Table 54

| 1 | 16 |
|---|----|
| 5 | 20 |
| 5 | 21 |
| 5 | 22 |
| 6 | 23 |
| 6 | 24 |
| 6 | 25 |
| 7 | 26 |
| 7 | 27 |

FIG.2B

| 230 STRING POOL | | |
|---|---|---|
| 1 | Feature_ID | 207 |
| 2 | Feature_Name | 209 |
| 3 | Attribute_F_A | 211 |
| 4 | Attribute_F_B | 212 |
| 5 | Feature_1 | |
| 6 | Feature_2 | |
| 7 | Feature_3 | |
| 8 | Feature_One | |
| 9 | Feature_Two | |
| 10 | Feature_Three | |
| 11 | Attribute_F_One | |
| 12 | Attribute_F_Two | |
| 13 | Attribute_F_Three | |
| 14 | Attribute_F_Four | |
| 15 | Attribute_F_Five | |
| 16 | Component_ID | 217 |
| 17 | Component_Name | 219 |
| 18 | Attribute_C_A | 221 |
| 19 | Attribute_C_B | 222 |
| 20 | Component_5 | |
| 21 | Component_6 | |
| 22 | Component_3 | |
| 23 | Component_4 | |
| 24 | Component_4 | |
| 25 | Component_6 | |
| 26 | Component_7 | |
| 27 | Component_8 | |
| 28 | Component_One | |
| 29 | Component_Two | |
| 30 | Component_Three | |
| 31 | Component_Four | |
| 32 | Component_Five | |
| 33 | Component_Six | |
| 34 | Component_Seven | |
| 35 | Component_Eight | |
| 36 | Attribute_C_One | |
| 37 | Attribute_C_Two | |
| 38 | Attribute_C_Three | |
| 39 | Attribute_C_Four | |
| 40 | Attribute_C_Five | |
| 41 | Attribute_C_Six | |
| 42 | Attribute_C_Seven | |
| 43 | Attribute_C_Eight | |
| 44 | Attribute_C_Five | |
| 45 | Attribute_C_Ten | |
| 46 | Feature_Preference | 213 |
| 47 | Comp_Preference | 223 |
| 48 | Prefer_Absent | |
| 49 | Prefer_Local | |
| 50 | Prefer_Source | |
| 51 | Prefer_Advertise | |
| 52 | Feature_Table | 205 |
| 53 | Component Table | 215 |
| 54 | Feature_Comp_Table | 225 |
| 55 | Status | |
| 56 | Installed | |
| 57 | Not_Installed | |

205'

| 52 | | | | |
|---|---|---|---|---|
| 1 | 2 | 3 | 4 | 46 | 55 |
| 5 | 8 | 11 | 12 | 1 | 57 |
| 6 | 9 | 13 | 11 | 1 | 57 |
| 7 | 10 | 15 | 14 | 1 | 56 |

215'

| 53 | | | | |
|---|---|---|---|---|
| 16 | 17 | 18 | 19 | 47 | 55 |
| 20 | 28 | 38 | 36 | 1 | 57 |
| 21 | 29 | 36 | 37 | 0 | 57 |
| 22 | 30 | 39 | 40 | 1 | 56 |
| 23 | 31 | 38 | 41 | 2 | 57 |
| 24 | 32 | 36 | 42 | 1 | 57 |
| 25 | 33 | 43 | 37 | 2 | 57 |
| 26 | 34 | 44 | 40 | 3 | 56 |
| 27 | 35 | 38 | 45 | 3 | 56 |

225'

| 54 | |
|---|---|
| 1 | 16 |
| 5 | 20 |
| 5 | 21 |
| 5 | 22 |
| 6 | 23 |
| 6 | 24 |
| 6 | 25 |
| 7 | 26 |
| 7 | 27 |

METHOD FOR OPTIMIZING THE PERFORMANCE OF A DATABASE

RELATED APPLICATIONS

This application is a divisional of application No. Ser. 09/157,853 filed Sep. 21, 1998, which is related to the following applications, all of which were filed on the same day and assigned to the same assignee as the parent application:

"Use of Relational Databases for Software Installation," now U.S. Pat. No. 6,237,144;

"System and Method for Repairing a Damaged Application Program," now U.S. Pat. No. 6,397,381;

"Method and System for Restoring a Computer to its Original State After an Unsuccessful Installation Attempt," now U.S. Pat. No. 6,363,499;

"A Method for Categorizing and Installing Selected Software Components," now U.S. Pat. No, 6,370,686;

"System and Method for Managing Locations of Software Components Via a Source List," now U.S. Pat. No, 6,269,377;

"Software Installation and Validation Using Custom Actions," now U.S. Pat. No. 6,378,127;

"Internal Database Validation," now U.S. Pat. No. 6,389,414;

"Management of Non-persistent Data in a Persistent Database"—Ser. No. 09/157,883;

"Method and System for Advertising Applications," now U.S. Pat. No. 6,345,386; and "Software Implementation Installer Mechanism," now U.S. Pat. No. 6,418,554.

TECHNICAL FIELD

The present invention generally relates to performance optimizations for relational databases. for the process of installing a software product onto a target computer system. More particularly, the present invention relates to performance optimizations for an installation database system for installing a software product onto a target computer system.

BACKGROUND OF THE INVENTION

A software product may be provided to an end-user through a variety of media. For example, a software product may be supplied via a magnetic disk, an optical disk or a network connection. The end-user may install the software product onto a target computer system by copying various components of the software product into the memory of the target computer system. To facilitate the installation process, the media containing the software product may include an installation database system that describes all of the features and components of the software product, as well as any additional installation information that may be helpful to the target computer system.

A relational database model may serve as an effective installation database system due to its ability to provide fast and efficient query processing, minimal redundancy of data and adequate data integrity. A relational database comprises a collection of data elements stored in a plurality of two-dimensional database tables. A row of a relational database table defines a data record, whereas each column in a row defines a single data element. Data elements may comprise integer data, string data and even simple object data.

The relational database model maintains a rigid storage structure, wherein the data fields comprising the columns of a relational database table are of a predetermined fixed length. As such, each row in a relational database table is of a uniform size. This uniform storage model allows for simple memory management techniques and minimal CPU cycles when a data record (row) is fetched from disk. Once a data record is fetched into main memory, a database engine can readily read or write a particular data element by simply jumping to a known offset for a given column in the data record and then reading or writing the next n bytes, where n is the size of a column in number of characters.

On the downside, however, a rigid storage structure may cause the persistent size of a relational database to be very large. For example, data elements that are too large to fit within in a fixed-length data field must be truncated. Thus, in order to avoid loss of data, data fields are typically designed to be large enough to accommodate the longest data element that is likely to be stored in the column. If a given data element does not occupy all the space available in the data field, the unoccupied space is filled with null values. Therefore, the rigid storage structure of the relational database model may lead to a great deal of wasted memory space and cause the performance of the database system to be diminished.

Also, the rigid storage structure of the relational database model does not allow for the direct addition of temporary rows and columns to a database table. Temporary rows and columns may be useful in managing data, such as installation data, that is dependant on dynamic external conditions.

An installation database is generally created and populated by the software developer that supplies the software product. For each version of the software product, the software developer must create and populate a new installation database. Presently, if an end-user desires to add enhancements, patches, or upgrades to a software product, a complete version of a new installation database must be obtained to replace the original installation database.

Accordingly, there is a need for a relational installation database model that maintains a uniform data storage structure while eliminating wasted memory space. There is also a need for a relational database model that provides for the direct addition of temporary rows and columns to a database tables. There is a further need for a method of modifying an installation database or an installed prior version of a software product to reflect upgrades, patches, or enhancements without supplying a complete version of a new installation database.

SUMMARY OF THE INVENTION

The present invention fulfills the needs in the art by providing optimizations for the process involved in the installation of a software product onto a target computer system. The present invention provides a relational installation database system that has increased performance and reduced persistent size. Persistent size is reduced by substituting non-integer data elements in a database table, whether in the form of strings, objects, etc., with integer identifiers. The integer identifiers are obtained from an index which maintains a sequential record of each unique occurrences of a data element. In effect, the data elements in a database table are aliased with integer identifiers and the relationship between the integer identifiers and the data elements is determined by accessing the index.

The data fields underlying a database table are two-dimensional data arrays. Aliasing the non-integer data elements of a database table with integers causes the data arrays to be uniform. Thus, manipulation of the data arrays is simplified. The present invention provides for the direct addition of temporary rows and columns to a database table by expanding and contracting the underlying data arrays. When temporary rows or columns are created, data elements in both the temporary and permanent rows and columns may be accessed and modified. Data elements in the permanent rows and columns persist in the database, while data elements in the temporary rows and columns do not persist.

Functionality is provided to allow installation database tables to be merged together. This allows software developers to develop software in a modular fashion and to create an installation database for each module. Installation database may then be merged into a final installation database that is shipped to the end-user. Further, differences between two or more installation database tables may be recorded in a database transform. This database transform may be applied to a database table in such a way that the changes are incorporated therein. Thus, software developers are able to provide enhancements, upgrades, patches, etc. to an end-user in the form of database transform, without the need for shipping an entire modified installation database.

DETAILED DESCRIPTION OF THE EXEMPLARY EMBODIMENTS

The present invention provides optimizations for the process of installing a software product onto a target computer system. In particular, the present invention contemplates the use of an installation database system to facilitate the installation process. As used herein, the phrase "database system" is meant to indicate a database and any associated database engines or management systems. An installation database may be a relational database for storing data elements that describe the features and components of a software product as well as other installation information. The present invention serves to optimize the performance of an installation database system by reducing persistent size and allowing greater flexibility in the physical structure of the installation database. The present invention also provides methods for utilizing an installation database to efficiently provide upgrades, patches, enhancements, etc. to an end user.

Still, while the exemplary embodiment of the present invention will be described in the general context of an installation database system, those skilled in the art will appreciate that certain principles of the present invention may be applied to any relational database system, irrespective of the particular application thereof.

Exemplary Operating Environment

Figure 1:
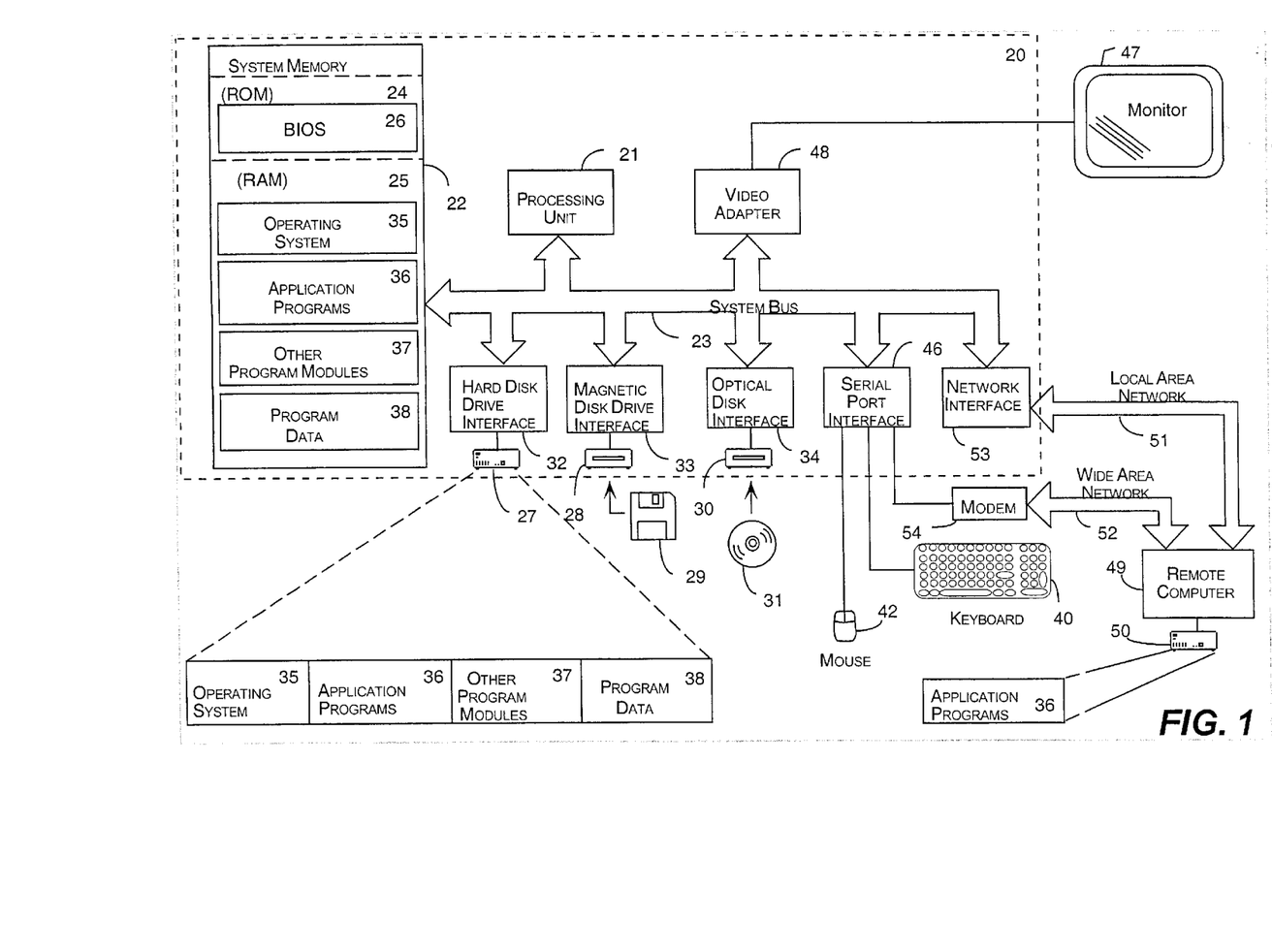
FIG. 1 is a functional block diagram of a computer system that provides an operating environment for the exemplary embodiments of the present invention.

Referring now to the drawings, in which like numerals indicate like elements throughout the several figures, FIG. 1 and the following discussion are intended to provide a brief, general description of a suitable computing environment in which the invention may be implemented. While the invention will be described in the general context of an installation database system that is run by an operating system in conjunction with a personal computer, those skilled in the art will recognize that the invention also may be implemented in combination with other program modules. Generally, program modules include routines, programs, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary operating environment 100 for implementing the invention includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

The computer system 120 may include additional input devices (not shown), such as a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120, including an operating system 135, an installation program module 137 and other program modules 138. In particular, the installation program module 137 may comprise a database engine or database management system for interacting with an installation database 139. The purpose of the installation program module 137 is to install the software product 136 onto a target computer system 120. The software product 136 and installation database 139 are generally provided via a computer-readable medium, such as a CD-ROM disk 131.

An installation database 139 is a file containing all the installation information (data) for a particular software product 136 that is to be installed onto a target computer system 120. The binary images comprising the software product 136 may be stored in a location external to the installation database 139, e.g. in distinct directories on the CD-ROM disk 131. Alternatively, the binary images may be stored in compressed cabinet files contained in streams within the installation database 120.

A CD-ROM 131 is typically introduced to the target computer system 120 through an optical drive 130. The software product 136 and installation database may also be provided via a magnetic disk 129, a memory storage device 150 of a remote computer system 149, or any other commonly known medium. Accordingly, the software product 136 and the installation database 139 may be introduced via a magnetic disk drive 128, or transferred from a remote computer 149 through a serial port interface 146 or a network interface 153. Other media and/or devices for providing and introducing a software product 136 to a target computer system 120 will be apparent to those skilled in the art and are considered to be within the spirit and scope of the present invention.

As shown, the installation program module 137 may reside on the hard disk drive 127 of the target computer system and may operate in conjunction with the operating system 135. For example, included with the WINDOWS operating system produced by Microsoft Corporation of Redmond, Wash. is a WINDOWS INSTALLER program module that is operable to detect and install a new software product 136 that is introduced to the target computer system 120. In addition, the installation program module 137 may be provided along with the software product 136 and the installation database 139 via a computer-readable medium, such as CD-ROM 131, or the like. Those skilled in the art will appreciate that the installation program module 137, the software product 136 and the installation database 139 may be provided independently of each other.

Once the software product 136, the installation database 139 and/or the installation program module 137 are introduced to the target computer system 120, the processing unit 121 executes the instructions of the installation program module 137 to install an install-set of the software product 136, i.e., the set of components that are to be installed, onto the target computer system 120. The application program module 136 may be thought of as comprising a set of features, which in turn comprise a set of components. Certain components may be required for proper operation of a feature of the software product 136, while other components may be optional.

The installation program module 137 may gather information regarding the current state of the computer system 120. The information gathered by the installation program module 137, in conjunction with information stored in the installation database 139 is used to determine which components of the software product 136 are to be included in the install-set. The install-set typically includes all required components and any optional components that are determined by the installation program module 137 to be appropriate for installation onto the target computer system 120.

Operation of an Exemplary Embodiment

Figure 2A:
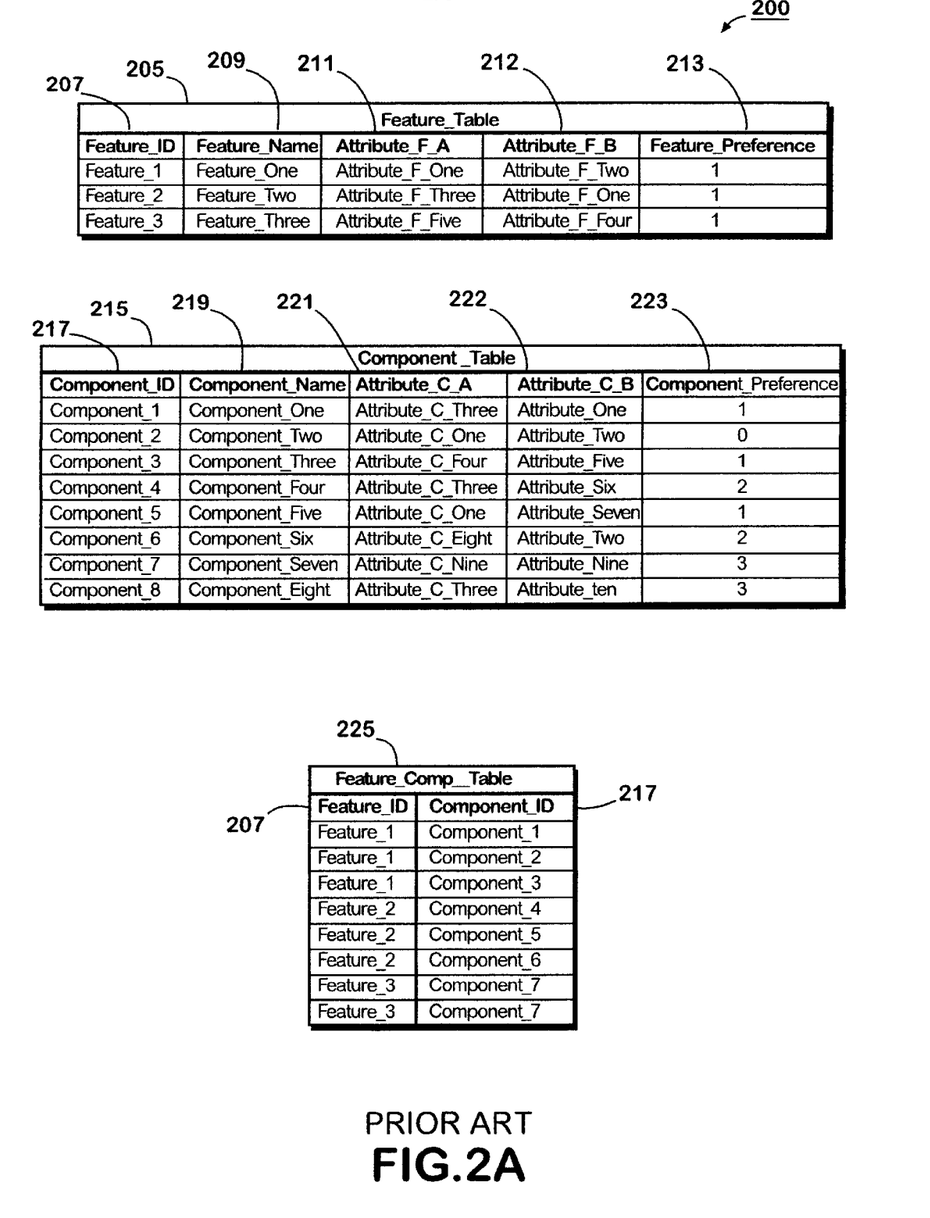
FIG. 2A illustrates a traditional relational database.

As mentioned above, the performance advantages provided by the relational database model are desirable in the context of an installation database. As such, an installation database may be a relational database comprising a collection of relational database tables. Each relational database table is identified by a unique table name. FIG. 2A shows a sample relational database comprising three tables: a Feature_Table 205, a Component_Table 215 and a Feature_Comp_Table 225. Relational database tables are two dimensional arrays comprising rows and columns. The rows of a relational database table define data records and the columns of each row represent individual data elements. Relational database rows, or records, are distinguished from each other through the use of keys. Relational database columns are identified by column names, also referred to as attributes. These and other concepts of relational databases are well known in the art.

In an exemplary embodiment, the data elements stored in the installation database tables 205, 215 and 225 correspond to software products, features of the software products and components of the features of the software products. As used herein, the phrase "software product" is meant to refer to an application program module or a suite of application program modules. A feature is a granular piece of a software product. The installation of a feature is optional. Features correspond roughly to the functional features of the software product itself, such as a "Proofing Tools" feature or a "Word" feature. Each feature is essentially a grouping of components and may also include other features. Features need not be globally unique, and therefore may be identified by any appropriate means, such as with a textual feature identifier.

A "component" is a collection of resources, such as or registry keys, that are all installed or uninstalled as a unit, Components are the building blocks of the software product that are not exposed to the user, A resource, such as a file or a registry key, may be part of only one component. Two components may not share the same resource whether they are part of the same software product 136 or parts of different software products. A discussion of features and components of a software product, and their role in an installation database, is described in U.S. Pat. No. 6,237,144, entitled "Use of Relational Databases for Software Installation" filed on Sep. 21, 1998 and owned by the assignee for the present application, This related application, U.S. Pat. No. 6,237,144, is hereby fully incorporated herein by reference.

As shown in FIG. 2A, Feature_Table 205 stores a list of features, which are identified by Feature_ID 207. Each record in the Feature_Table 205 also includes a Feature_Name 209, an Attribute_F_A 211, an Attribute_F_B 212 and a Feature_Preference 213. The Component_Table 215 is constructed in the manner similar to the Feature_Table 205, but stores records for components instead of features. Each record in the Component_Table 205 includes a Component_Name 219, an Attribute_C_A 221, an Attribute_C_B 223 and a Component_Preference 223. The Feature_Comp_Table 225 associates Feature_IDs 207 with Component_IDs 217. As can be seen, the data elements stored in the database tables of FIG. 2A comprise string data, each string having a variable length, and integer data.

In order to improve the performance of the database engine within the installation program module 137, the present invention undertakes to simplify and reduce the physical storage model of the installation database 139. Such simplification and reduction is accomplished by populating an installation database table with only integer identifiers that represent each of the installation data elements. In effect, each non-integer data element is aliased with an integer identifier. In order to keep track of the original data elements, an index is created for storing a single copy of each unique string, object or other non-integer type of installation data that may be included in the installation database 139. The data element corresponding to a given integer identifier in a database table may be determined by reference to the index.

Integers are generally more uniform and compact than strings or objects. Thus, by aliasing an installation database with integers, the size and complexity of the database may be significantly reduced. For example, the columns of the installation database 139 may be set to a fixed size due to the single type of data stored therein. Also, less memory is utilized because only one copy of each string or object is stored in the index. As another benefit, the index storing the string and object data elements is not a database table and is thus not subject to any size restrictions that would be imposed on a database table. Thus, for example, strings stored in the index may be up to 64 k bytes in size. In addition to strings, reference-counted objects (COM objects) are also used in the exemplary installation database and thus, object references may be stored directly as integer values when they fit in the size of a database integer (32-bits). The use of COM objects insures that only a single copy of the object exists for any number of references to it. For objects that must be referenced by 64-bit pointers, a separate index may be created and such objects may be aliased in a manner similar to strings.

In addition to keeping the index of data elements, a corresponding array is required to hold a reference count for each data element. A reference count is used to keep track of each data element, so that a data element may be released from memory when it is no longer referenced by any table or cursor in the database. Both the data elements and the corresponding reference counts must be persisted when the database is committed. An additional complexity occurs with temporary data elements, which are discussed in greater detail below. Temporary data elements must operationally behave in the same manner as persistent data, but when the database is committed, the reference counts for the temporary data elements must be excluded, as well as the data elements themselves if they have only temporary references.

Figure 2B:
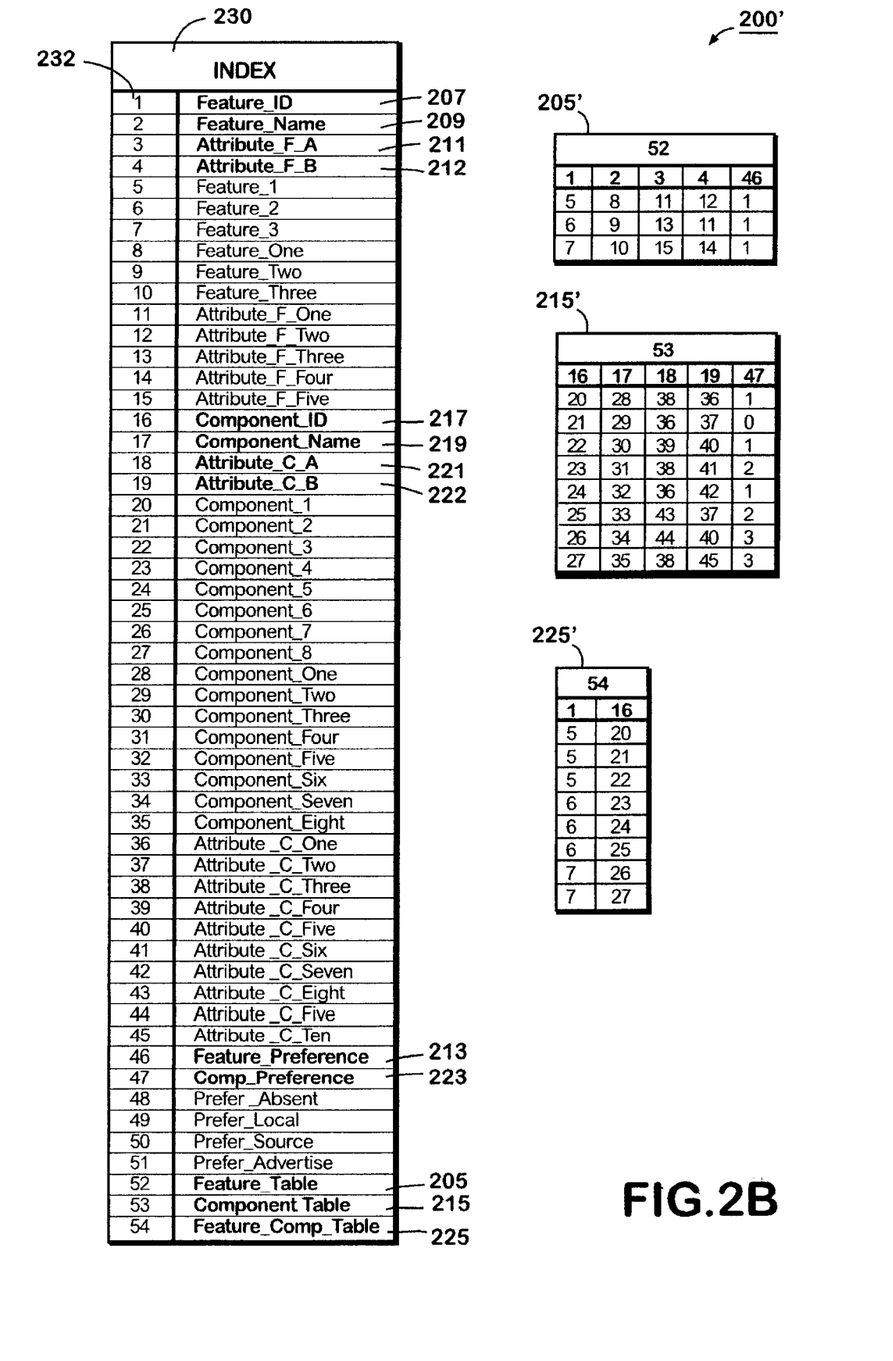
FIG. 2B illustrates a relational database that has been aliased with integer identifiers.

FIG. 2B illustrates an installation database 200' that has been aliased with integer identifiers. Aliased installation database 200' corresponds to the installation database 200 of FIG. 2A. In FIG. 2B, index 230 stores each unique occurrence of a string data element that is found in the Feature_Table 205, the Component_Table 215 and the Feature_Comp_Table 225 of installation database 200. For example, the string "Feature_ID" 207 is stored as a first entry in the index 230. As can be seen, there are no duplicate entries in the index 230. The left-most column 232 in the index 230 stores sequential integer values identifying each entry in the index 230. Column 232 is shown for illustrative purposes only and is actually superfluous because a computer system will automatically assign sequential integers identifiers to the elements of a sequential index structure, such as index 230.

The sequential integer identifiers created in the index 230 are used to alias the data elements in the database tables. For example, Feature_Table 205 from FIG. 2A may be converted into table "52" 205' shown in FIG. 2B. As can be seen, entry number 52 in the index 230 corresponds to the string "Feature_Table" 205. Also, entry number 1 in the index 230 corresponds to the string "Feature_ID." Therefore, the integer identifier "1" is stored as the first entry in table "52" 205'. Similarly, entry number 5 in the index 230 corresponds to the string "Feature_1." Accordingly, the integer identifier "5" is stored in table 52 205' in the location corresponding to the field where the string "Feature_1" is stored in Feature_Table 205. All rows and columns of each database table in the exemplary installation database are populated in the same fashion. It should be noted that the integer identifiers are stored in the database table columns having a data type other than integer. Thus, in aliased table "52," there is no conflict between the integer identifier "1" and the original integer data stored in column "46". Comparing the database tables 205, 215 and 225 of FIG. 2A to the corresponding database tables 205', 215' and 225' of FIG. 2B, it can be seen that the persistent size of database tables 205', 215' and 225' has been significantly reduced.

In the exemplary embodiment, index 230 is a hashed index. As such, a string data element and its corresponding integer identifier may be located in index 230 in a quick and efficient manner. The installation program module 137 will query the installation database 200' in order to access or modify string data elements. A database query may include the name of one or more string data elements. Integer identifiers corresponding to the queried string data elements in may be located in the index 230 using any well-known hashing function. The appropriate integer identifiers are then copied into database cursors, which are used to locate the corresponding aliased data elements in the database tables. Database cursors are well known within the art and further discussion thereof is not necessary.

An example database query that might be used in conjunction with the traditional relational database 200 shown in FIG. 2A is as follows:

Select Component_Name

From Component_Table

Where Component_Preference="0".

This standard database query seeks the Component_$_{13}$ Name 219 of any component in the Component_Table 215 that has a Component_Preference 223 of "0". The result set for this query comprises the data element "Component_Two." In the aliased database system of FIG. 2B, the above example query would be effectively converted into the following query, using the hashed index 230:

Select 17

From 53

Where 47="0".

The converted query is processed in a traditional manner using the aliased database tables. For example, the installation program 137 will recognize from the query format that "53" is a table name, "17" and "47" are column names and "48" is a data element. A cursor of a row in table "53" will be created and the value "48" will be stored in column "47." Table "53" will then be searched, using the cursor, using a binary search method or any other well known search method. As can be seen from FIG. 2B, the result set for this converted query comprises the data element "29." Referencing the index 230, the string data element "Component_Two" corresponding to the integer identifier "29" may be quickly located, i.e. by accessing index entry number 29.

Figure 3:
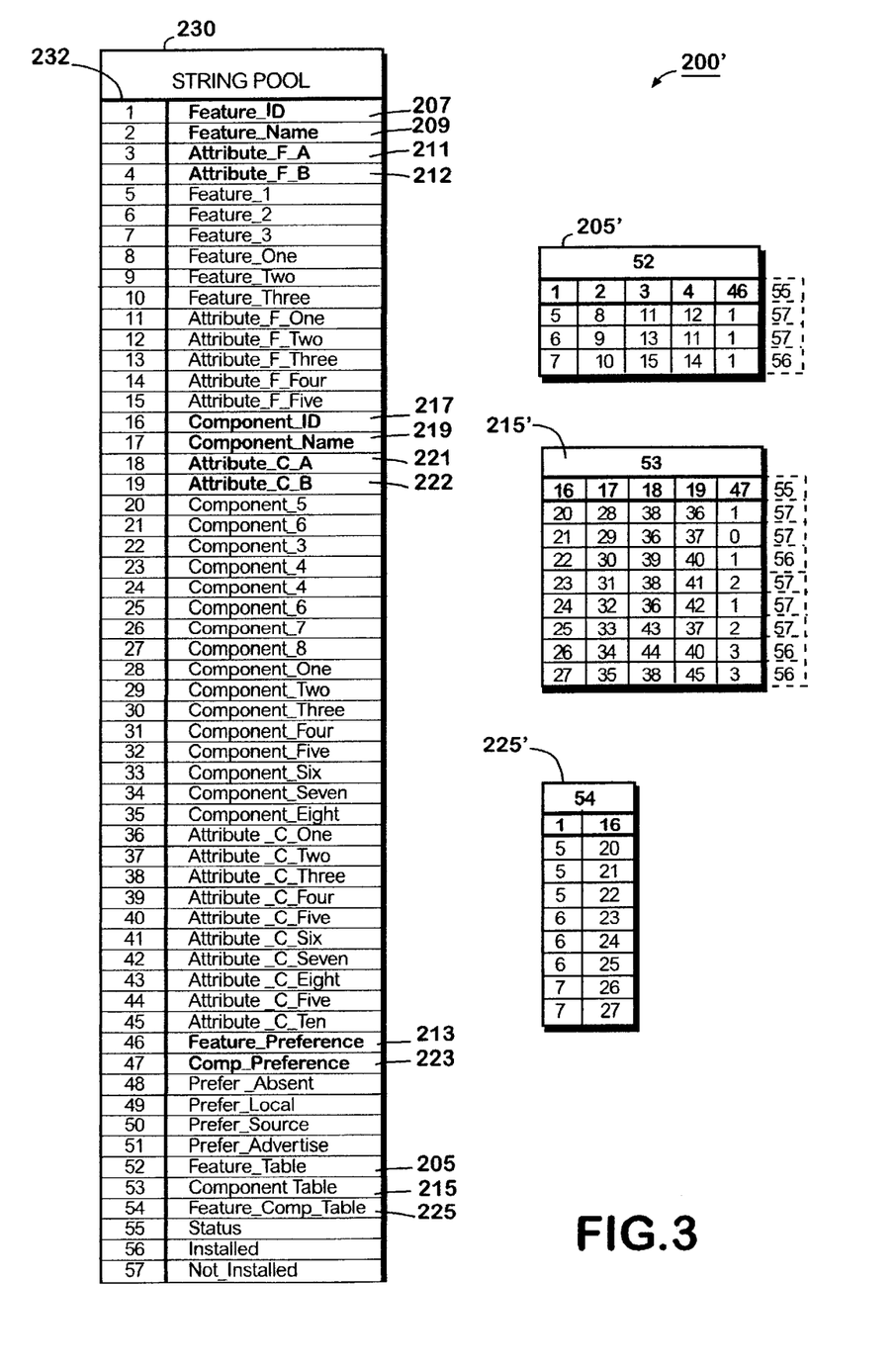
FIG. 3 illustrates the direct addition of a temporary column to a relational database table.

The uniformity of aliased database tables also allows for the direct addition of temporary rows and columns. FIG. 3 illustrates the concept of adding a temporary column 305 to a database table. As mentioned above, a relational database table is actually a two-dimensional array. In the situation where all fields in the array are uniform, it is a simple matter to expand the array to accommodate additional rows and column. In the exemplary embodiment, internal application program interfaces (APIs), such as "CreateColumn" and "CreateRow," are used to add temporary columns and rows to a database table. The internal APIs allow certain properties of the new column or row to be designated. One such property may be that the row or column is temporary. Externally, a temporary rows and columns are added using an SQL extension keyword, "TEMPORARY."

In the installation database context, temporary rows and columns may be useful when the result of a database query depends on dynamic external conditions. By way of example, prior to installation of a software product, it may be desirous to determine whether a given component of the software product is already installed on the target computer system 120. The installation program module 137 may be programmed to scan the target computer system 120 to locate previously installed components. As shown in FIG. 3, a temporary column 305 labeled "55" may be added to table "53" 215' (the aliased Component_Table) to store a data element that indicates the installation status of each component of a software product 136. If a previously installed component is located by the installation program module 137, the integer identifier "56" is stored in temporary column "55" 305. Note that entry number 55 in the index 230 is associated with the string "Status" and that entry number 56 is associated with the string "Installed."

While temporary rows and columns are in existence, data elements in both the temporary and permanent rows and columns may be directly accessed and modified. The data elements stored in those temporary rows and columns do not persist in the database. However, any modifications made to the data elements in the permanent rows and columns do persist, independent of the temporary rows and columns.

Temporary data is also described in U.S. application Ser. No. 09/157,883, entitled "Management of Non-persistent Data in a Persistent Database" filed on Sep. 21, 1998 and owned by the assignee for the present application. This related application, U.S. application Ser. No. 09/157,883, is hereby hilly incorporated herein by reference.

The present invention further extends the functionality of an installation database system by providing methods for efficiently managing and manipulating installation database tables. For example, database tables may be merged using a "merge" or "union" operation of relational algebra. Software developers may thus create installation database tables in a modular fashion and merge the modules into a single installation database table when the software product 136 is complete. Also, installation databases may subsequently be created for patches or enhancements for a software product 136. These subsequent installation databases may be shipped to an end-user and may be merged into the original installation database.

Figure 4:
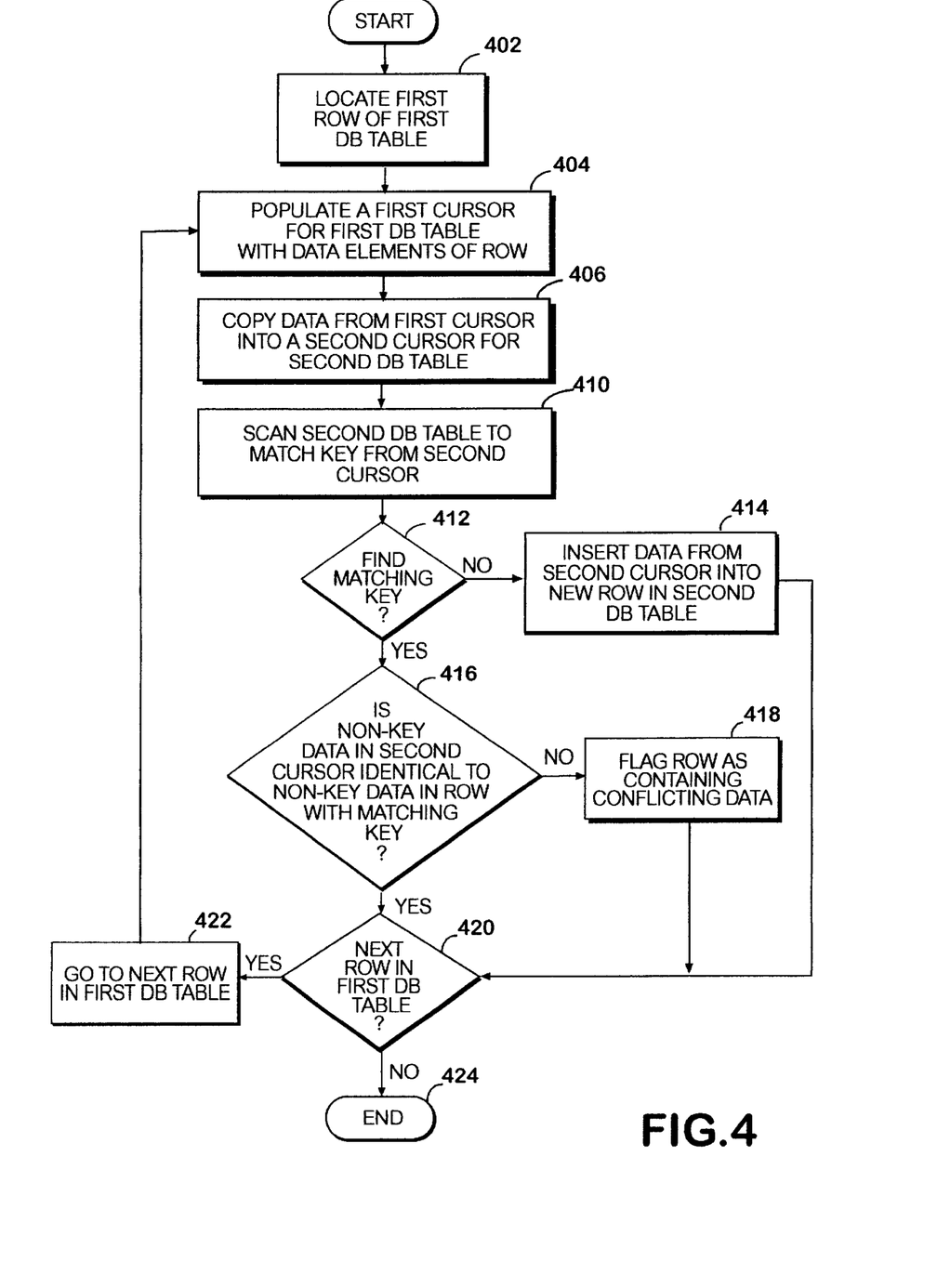
FIG. 4 is a flow chart demonstrating the process involved in an exemplary merger of two installation database tables.

An exemplary merger of two aliased database tables is described in FIG. 4. At step 402, the first row of the first table is located. As previously mentioned, a row of a database table is identified by a key, which comprises one or more of the data elements in the columns of the row. At step 404, a first cursor corresponding to the first table is populated with the data elements from the first row. Then, at step 406, the contents of the first cursor are copied into a second cursor corresponding to the second table. At step 410, the second table is searched to locate a row of data that is identified by the same key that is stored in the second cursor. If no matching key is found in the second table at step 412, a new row is added to the second table and the data elements stored in the second cursor are copied into the new row at step 414. However, if a matching key is located in the second database table, it is determined at step 416 whether the non-key data elements in the corresponding row are all identical to the non-key data elements in the second cursor. If the non-key data in the located row of the second table is not identical to the non-key data in the second cursor, a merge conflict is indicated at step 418 by flagging the conflicting row. Conflicting data elements are not merged into the second database table and may be called to the user's attention, so that such conflicts may be resolved. If the non-key data in the located row of the second table is identical to the non-key data in the second cursor, no action is taken with respect to that data.

At step 420, a determination is made as to whether a next row exists in the first table. If a next row does exist in the first table, the next row is located at step 422, the data stored therein is copied to the first cursor at step 404 and the above-described method is repeated. If no next row exists in the first table, the method is terminated at step 424. To support merging and other database extensions, additional table and cursor operations have been implemented in addition to the standard insert, update, and delete. The merge operation performs the logic above for merging data into an existing table. Additional operations are: assign, which forces in data whether or not the key exists; replace, which allow primary keys to be edited; and several row validation operations. Externally these are invoked via the MsiView-Modify API, using specific enumeration values, along with the data record.

Installation database systems may also benefit from the "transform," or "difference," operation of relational algebra. This operation determines the differences between two databases and creates a temporary file of only those differences. A database transform is a recording of the differences between two database tables. A database transform may be stored using a stream of changed data for each non-identical table.

Database transforms become very useful in providing customized installations, in synchronizing a program module to operate in different languages and in providing "patches" to fix various bugs in a program module. For example, an installation database may be modified to effect a custom installation of a software product 136. A database transform may be created to record the differences between the original installation database tables and the modified database tables. Subsequently, the modifications recorded in the database transform may be applied to another copy of the original installation database, so that another end-user may obtain the same custom installation without having to manually perform the customization.

As another example, an English version and a Spanish version of a software product 136 may be created, each having its own installation database. A database transform may be created to record the differences between the English version and the Spanish version. Subsequently, the database transform may be applied to an installation database table corresponding to an updated English version of the software. The resulting "transformed" database will produce an updated Spanish version of the software product 136.

Figure 5:
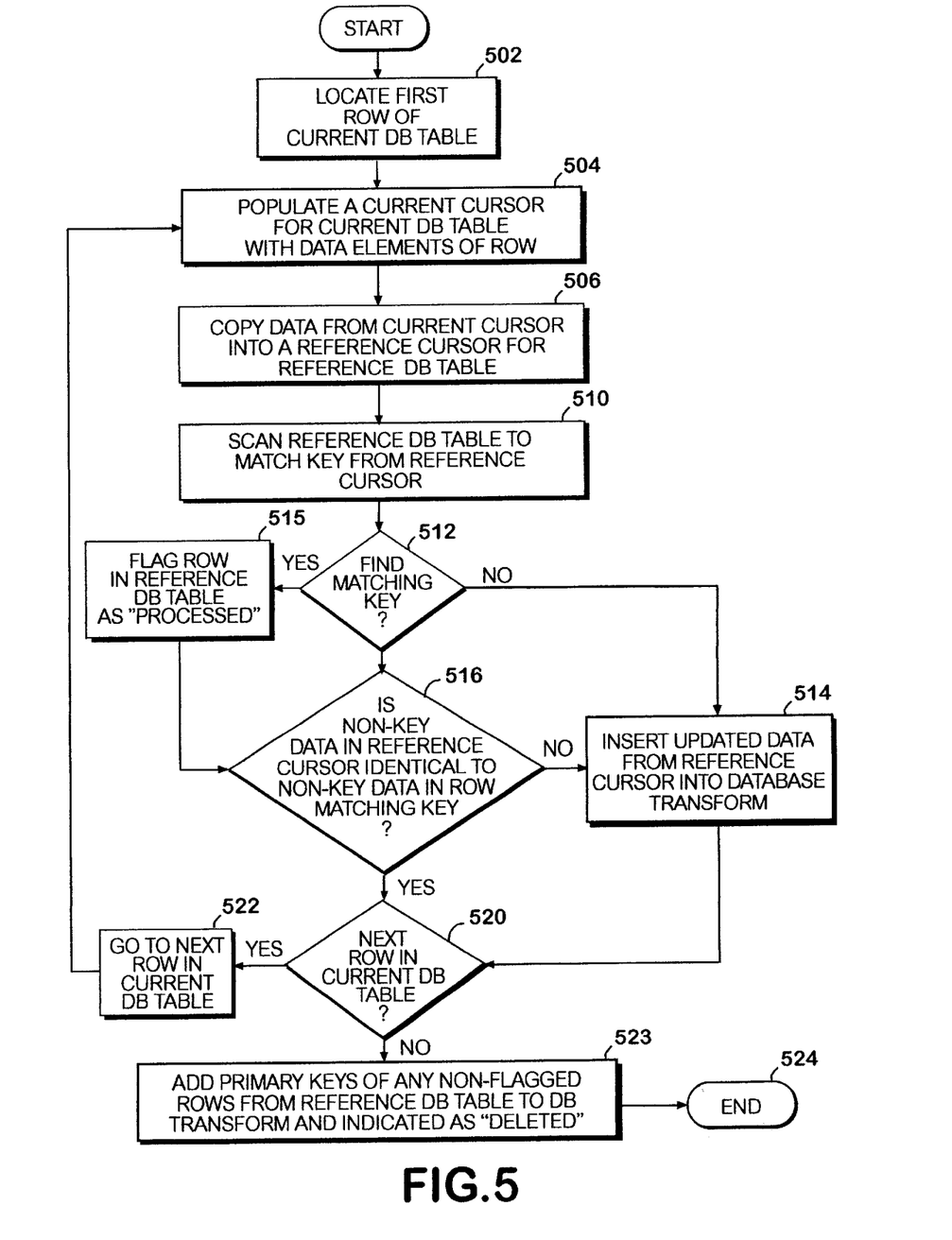
FIG. 5 is a flow chart demonstrating the process involved in creating a transform database table to record the differences between two installation database tables.

FIG. 5 describes the creation of an exemplary database transform for recording the differences between a reference database table and a current database table. At step 502, the first row of a current table is located. At step 504, a current cursor corresponding to the current table is populated with the data elements from the first row. Then, at step 506, the contents of the current cursor are copied into a reference cursor corresponding to a reference table. At step 510, the reference table is searched to locate a row of data that is identified by the same key that is stored in the reference cursor. If no matching key is found in the reference table at step 512, a row is added to a database transform and the data elements stored in the reference cursor are copied into the database transform at step 514. However, if a matching key is located in the reference database table, at step 515 the corresponding row in the reference table is flagged to indicate that it has been processed. Then, at step 516 the data elements in the corresponding row that are not identical to the data elements in the reference cursor are copied into the transform at step 514. If the data in the located row of the reference table is identical to the data in the reference cursor, no action is taken with respect to that data. At step 520, a determination is made as to whether a next row exists in the current table. If a next row does exist in the current table, the next row is located at step 522, the data stored therein is copied to the current cursor at step 504 and the above-described method is repeated. If no next row exists in the current table, the method proceeds to step 523.

At step 523, the primary keys of any non-flagged rows from the reference table are copied into the transform and are indicated to be rows that have been deleted from the current database table. Thus, when the database transform is applied to a new database table, the non-flagged rows will be deleted therefrom. In a similar manner, columns that are not present in the reference database may be registered in the transform as columns to be created at the time the transform is applied. Likewise, tables that are added or removed are registered in the transform, such as is necessary to be able to recreate a new database by applying the transform to the reference database. Following completion of step 523, the method ends at step 524.

Those skilled in the art will appreciate that certain principles of the present invention, while particularly beneficial to aliased installation databases, may be applied to any relational-type installation databases. For example, the concept of directly adding temporary rows and columns to a relational database table does not require that the data elements in the database table be aliased with integer identifiers. Furthermore, the concept of directly adding temporary rows and columns to a relational database table is not limited to installation database. Similarly, the concepts of providing upgrades, patches, enhancements, etc. for a software product by manipulating installation database tables through operations such as merges and transforms does not require the installation database tables to be aliased.

In view of the foregoing, it will be appreciated that the present invention provides optimizations for the process of installing a software product onto a target computer system. Still, it should be understood that the foregoing relates only to the exemplary embodiments of the present invention, and that numerous changes may be made thereto without departing from the spirit and scope of the invention as defined by the following claims.

I claim:

1. A method for reducing the persistent size and optimizing the performance of a relational database system, comprising the computer implemented steps of:

storing in an index a copy of each non-integer unique data element that would occur in a database table;

sequentially assigning to each entry in the index a corresponding integer identifier;

populating the database table with the corresponding integer identifier for each non-integer unique data element so that the database table uniformly contains integers; and keeping a reference count for each non-integer unique data element to control the data element's lifetime.

2. The method of claim 1, further comprising the steps of:

accepting a database query containing a queried data element;

searching the index to determine the integer identifier corresponding to the queried data element;

in response to determining the integer identifier corresponding to the queried data element, searching the database table to locate a record containing the integer identifier corresponding to the queried data element; and processing the query.

3. The method of claim 2, wherein the index is a hashed index; and wherein searching the index comprises evaluating a hashing function.

4. The method of claim 2, wherein the step of searching the database table comprises:

creating a cursor for the database table;

populating the cursor with information from the database query and the integer identifier corresponding to the queried data element; and using the populated cursor to perform a binary search on the database table, so as to identify the corresponding integer data element in the database table.

5. The method of claim 1, further comprising the step of adding a temporary row to the database table to store integer identifiers corresponding to temporary data elements.

6. The method of claim 1, further comprising the step of adding a temporary column to the database table to store integer identifiers corresponding to temporary data elements.

7. The method of claim 5, further comprising the step of:

modifying the integer identifiers corresponding to data elements and temporary data elements;

wherein the modifications to integer identifiers corresponding to the data elements persist, but the modifications to the integer identifiers corresponding to temporary data elements do not persist.

8. A computer-readable medium having stored thereon the computer-implemented steps of claim 1.

9. A method for reducing the persistent size and optimizing the performance of a relational database system, comprising the computer implemented steps of:

storing in an index a copy of each non-integer unique data element that would occur in a database table;

sequentially assigning to each entry in the index an integer identifier;

populating the database table with the integer identifiers corresponding to each data element;

keeping a reference count for each data element to control its lifetime; and adding a temporary column to the database table to store a plurality of temporary data elements, the temporary data elements not persisting in the database table.

10. The method of claim 9, further comprising the step of adding a temporary row to the database table to store the temporary data elements.

11. A method for reducing the persistent size and optimizing the performance of a relational database system, comprising the computer implemented steps of:

storing in an index a copy of each non-integer unique data element that would occur in a database table;

sequentially assigning to each entry in the index an integer identifier;

populating the database table with the integer identifiers corresponding to each data element;

keeping the reference count for each data element to control the data element's lifetime;

adding either a temporary row or a temporary column to the database table to store integer identifiers corresponding to temporary data elements; and modifying the integer identifiers corresponding to data elements and temporary data elements; wherein the modifications to integer identifiers corresponding to the data elements persist, but the modifications to the integer identifiers corresponding to temporary data elements do not persist.

12. The method of claim 11, further Comprising the steps of:

accepting a database query containing a queried data element;

searching the index to determine the integer identifier corresponding to the queried data element;

in response to determining the integer identifier corresponding to the queried data element, searching the database table to locate a record containing the integer identifier corresponding to the queried data element; and processing the query.

13. The method of claim 12, wherein the index is a hashed index, and wherein searching the index comprises evaluating a hashing function.

14. The method of claim 12, wherein the step of searching the database table comprises;

creating a cursor for the database table;

populating the cursor with information from the database query and the integer identifier corresponding to the queried data element; and using the populated cursor to perform a binary search on the database table, so as to identify the corresponding integer data element in the database table.

15. A computer program product comprising a computer readable medium carrying computer executable instructions that implement a method for reducing the persistent size and optimizing the performance of a relational database system, the method comprising:

storing in an index a copy of each non-integer unique data element that would occur in a database table;

sequentially assigning to each entry in the index an integer identifier; populating the database table with the integer identifiers corresponding to each data element;

keeping the reference count for each data element to control the data element's lifetime;

adding either a temporary row or a temporary column to the database table to store integer identifiers corresponding to temporary data elements; and modifying the integer identifiers corresponding to data elements and temporary data elements; wherein the modifications to integer identifiers corresponding to the data elements persist, but the modifications to the integer identifiers corresponding to temporary data elements do not persist.

16. The computer program product of claim 15, the method further comprising:

accepting a database query containing a queried data element;

searching the index to determine the integer identifier corresponding to the queried data element;

in response to determining the integer identifier corresponding to the queried data element, searching the database table to locate a record containing the integer identifier corresponding to the queried data element; and processing the query.

17. The computer program product of claim 16, wherein the index is a hashed index, and wherein searching the index comprises evaluating a hashing function.

18. The computer program product of claim 16, wherein searching the database table comprises:

creating a cursor for the database table;

populating the cursor with information from the database query and the integer identifier corresponding to the queried data element; and using the populated cursor to perform a binary search on the database table, so as to identify the corresponding integer data element in the database table.

* * * * *

UNITED STATES PATENT AND TRADEMARK OFFICE
CERTIFICATE OF CORRECTION

PATENT NO. : 6,606,618 B2
DATED : August 12, 2003
INVENTOR(S) : John C. Delo

It is certified that error appears in the above-identified patent and that said Letters Patent is hereby corrected as shown below:

Title page,
Item [57], ABSTRACT,
Line 9, after "performance" please insert -- . --

Column 1,
Line 36, after "databases" please delete "."

Column 2,
Line 41, after "columns to" please delete "a"

Column 7,
Line 2, after "that" please delete "arc" and insert -- are --
Line 2, after "as a unit" please delete "," and insert -- . --
Line 4, after "to the user" please delete "," and insert -- . --
Line 13, after "present application" please delete "," and insert -- . --
Line 57, after "up to" please delete "64 k" and insert -- 64k --

Column 8,
Line 59, before "may be" please delete "in"

Column 9,
Line 4, after "seeks the" please remove "Component$_{13}$Name" and insert
-- Component_Name --
Line 34, before "In the exemplary" please delete "column." and insert -- columns. --
Line 40, after "Externally," please delete "a"

Column 10,
Line 6, before "incorporated" please delete "hilly" and insert -- fully --

UNITED STATES PATENT AND TRADEMARK OFFICE
CERTIFICATE OF CORRECTION

PATENT NO.   : 6,606,618 B2
DATED        : August 12, 2003
INVENTOR(S)  : John C. Delo It is certified that error appears in the above-identified patent and that said Letters Patent is hereby corrected as shown below:

Column 13,
Line 47, after "further" please delete "Comprising" and insert -- comprising --

Signed and Sealed this

Twenty-fifth Day of May, 2004

JON W. DUDAS
*Acting Director of the United States Patent and Trademark Office*